(No Model.)
D. E. DARNELL.
DISTRIBUTER FOR INSECT POISON AND FERTILIZERS.
No. 254,804. Patented Mar. 14, 1882.
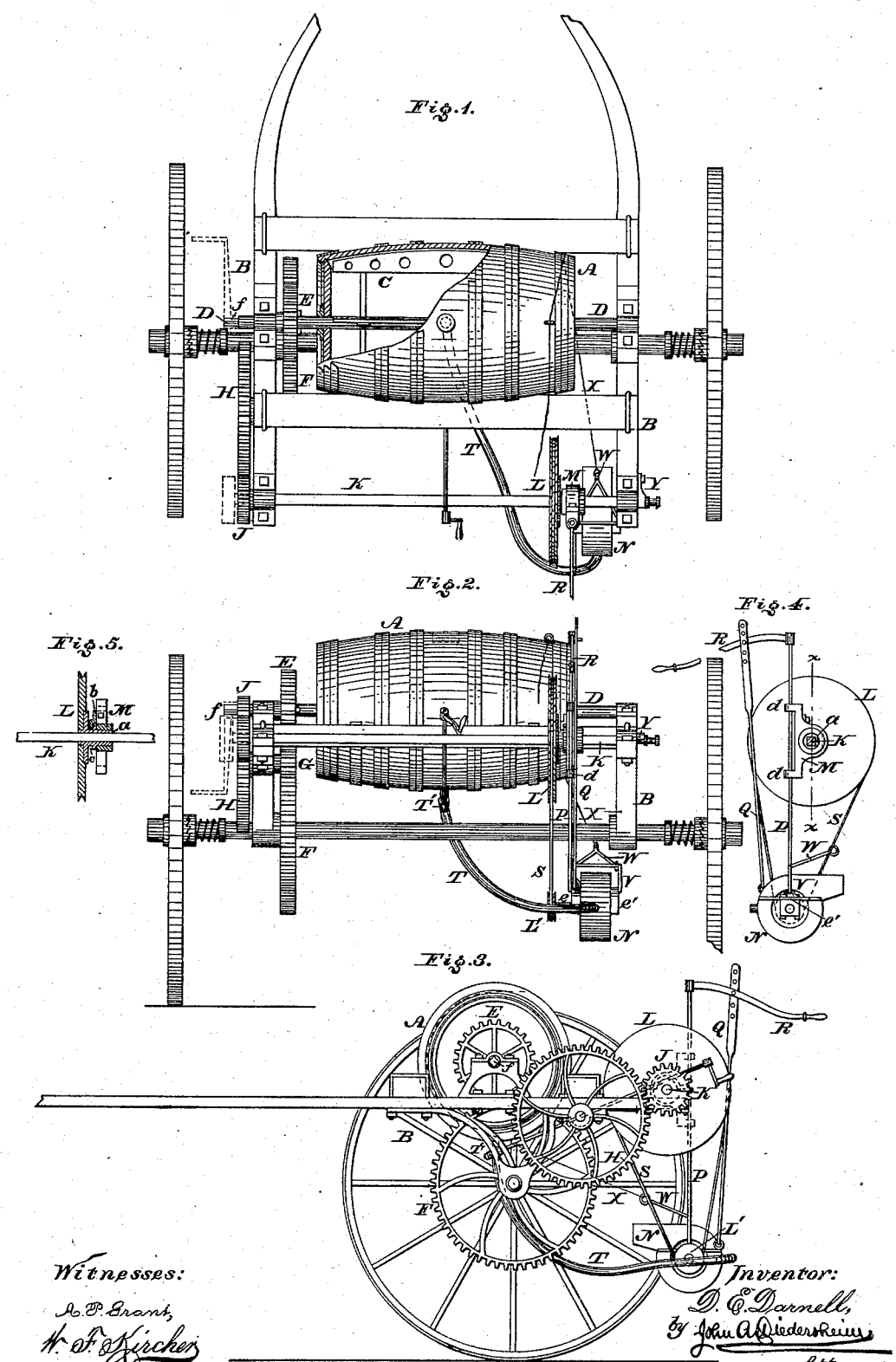

UNITED STATES PATENT OFFICE.

DAVID E. DARNELL, OF MASONVILLE, NEW JERSEY.

DISTRIBUTER FOR INSECT-POISON AND FERTILIZERS.

SPECIFICATION forming part of Letters Patent No. 254,804, dated March 14, 1882.

Application filed June 15, 1881. (No model.)

*To all whom it may concern:*

Be it known that I, DAVID E. DARNELL, a citizen of the United States, residing at Masonville, in the county of Burlington, State of New Jersey, have invented a new and useful Improvement in Distributers of Insect-Poison and Fertilizers, which improvement is fully set forth in the following specification and accompanying drawings, in which—

Figure 1 is a top or plan view, partly sectional, of the distributer embodying my invention. Fig. 2 is a rear view thereof. Fig. 3 is a side elevation thereof. Fig. 4 is a side view of a detached portion. Fig. 5 is a view of a detached pulley and connections.

Similar letters of reference indicate corresponding parts in the several figures.

My invention consists of an apparatus for distributing liquid poison on plants, &c., continuously in the form of spray for destroying and preventing lodgment of insects thereon, and for fertilizing plants, &c. Provision is made for adjusting the spraying-chamber, agitating the fluid or material in the barrel or receptacle, and throwing the apparatus out of gear.

Referring to the drawings, A represents a barrel, tank, or receptacle, which is properly mounted on a carriage or wheeled truck, B, and provided with an agitator or stirrer, C, the shaft D whereof is suitably supported on the carriage and carries a shiftable spur-wheel, E, with which meshes a spur-wheel, F, which is connected to the axle of the carriage and receives rotation therefrom, whereby the stirrer C may be operated. Meshing with the wheel F is a pinion, G, whose shaft, properly mounted on the carriage B, carries a spur-wheel, H, with which engages a pinion, J, on the end of a shaft, K, mounted on the rear of the carriage. A portion of the shaft K is squared, and on the same is fitted a band wheel or pulley, L, the hub of which is squared to accord with the shaft K, whereby said pulley may rotate with the shaft and be moved or slide laterally thereon. One side of the hub of the pulley L has fitted over it a sleeve or cylindrical bushing, *a*, which is encircled by and supports a bracket or swivel-piece, M, which is connected to the pulley L by means of a finger, *b*, which projects freely into a groove, *c*, in the hub of said pulley, (see Fig. 5,) whereby, while the pulley rotates with the shaft K, the swivel M swings freely on the bushing *a*, and when the pulley is moved or shifted laterally it carries the swivel with it.

N represents a fan or blower, which is suspended from a rod, P, passed through eyes *d* in the swivel M and attached freely to a piece, *e*, on the inner side of the fan-case. To the rear of the fan-case is jointed a rod, Q, whose upper end is pivoted to a hand-lever, R, whose forward end is connected to the top of the rod P, whereby by raising or lowering said lever R the inclination of the fan may be adjusted so as to set its mouth at the proper angle to the plants, &c., to be sprayed or sprinkled. The fan receives power by means of a belt or band, S, which is passed around the pulley L and a pulley, L', on the shaft of the fan, and communication is established between the fan-case and the barrel or receptacle A by means of a flexible tube or pipe, T, which is connected to said parts, a cock, T', being suitably applied to the barrel or the pipe T, and provided with a handle conveniently located for opening and closing the supply of fluid poison, &c., to and from said pipe T, and consequently the fan-case.

To the rod P and the opposite side piece, *e'*, of the fan-case is attached a yoke, V, which, rigidly attached to the rod and jointed to the piece, has connected to it a swinging piece, W, to whose forward end is attached a chain or cord, X, connected to the barrel A. It will be seen that by tightening or loosening said cord X the fan-case may be brought forward or allowed to move rearward, turning on the shaft K as a center, and the fan-case is thus raised or lowered or adjusted in height.

In practice the weight of the fan-case keeps the band S stretched and taut, the rod P moving somewhat freely in the eyes of the swivel M, or it may be tightened therein, so that the primary adjustment of the fan-case as to height may be accomplished by said rod P and the band S, but subsequent adjustment by the cord X. The yoke V, piece W, and cord X also serve to keep the fan-case true to the front, as said case is freely suspended, and the rod P and band S are at one side thereof.

As has been stated, the pulley L and connected swivel M may be moved laterally. By this provision the fan-case may be adjusted laterally relatively to the rows of plants and other requirements without interference with the proper operation of the parts.

The barrel is supplied, when so required, with water and paris-green or other insect-poison in proper quantities, for which purpose the top of the barrel has a suitable opening or lid. The wheel E of the shaft D is shifted so as to be out of gear with the wheel F of the axle of the carriage. A crank-handle is then fitted on the squared end $f$ of the shaft D and operated so as to rotate the agitator or stirrer C, whereby the poison is thoroughly mixed and dissolved in condition to be passed to the fan. The wheel E is then restored to engagement with the wheel F, the crank-handle removed, if desired, and the carriage drawn forward, the operator following. The cock T' is opened, and as the fan is rotated the fluid leaving the barrel enters the fan-case, from whence, under the action of the fan, it is converted into spray, and so driven by the fan upon the plants, ground, &c., as desired, the operator guiding or controlling the fan-case as occasion requires, it being seen that owing to the continuous action of the fan on the liquid and the light nature of the spray the latter reaches every part of the plants without injuring or weighing down the same.

When the fan is not required for service, the carriage being in motion, the wheel J of the shaft K is shifted from the wheel H, whereby by moving said shaft the latter is inoperative; but when said shaft is in service it is held in position by means of a latch, Y, or other fastening, which is connected to the frame of the carriage and freely engages with a neck, shoulder, or groove of the shaft, and may be readily disengaged therefrom when the shaft is to be moved for throwing the two wheels H J out of gear.

It is evident that fertilizing material may be employed and readily sprayed or distributed by my apparatus.

Having thus described my invention, what I claim as new, and desire to secure by Letters Patent, is—

1. A barrel mounted on a carriage or truck, gearing operated by said truck, and an outlet-pipe connected to said barrel, in combination with a rotary fan, N, operated by said gearing, the case of said fan communicating with said barrel, substantially as and for the purpose set forth.

2. A barrel mounted on a carriage or truck, in combination with a rotary fan and gearing operated by said truck, the case of the fan being adjustable in vertical, lateral, and angular directions, substantially as and for the purpose set forth.

3. The barrel A, inclosed agitator C, and shaft D, in combination with the shifting wheel E, the shaft K, the pipe or tube T, and the fan, substantially as and for the purpose set forth.

4. The barrel and fan in combination with the belt S, laterally-shiftable belt-pulley L, and shaft K, substantially as and for the purpose set forth.

5. The fan in combination with the pulley L, bushing $a$, and swivel M, substantially as and for the purpose set forth.

6. The fan in combination with the rods P Q and lever R, substantially as and for the purpose set forth.

7. The suspended fan in combination with the yoke V, piece W, and cord X, substantially as and for the purpose set forth.

8. The shaft K, with pinion J, and pulley L, and carrying the suspended fan, in combination with the latch Y, substantially as and for the purpose set forth.

DAVID E. DARNELL.

Witnesses:
 JOHN A. WIEDERSHEIM,
 A. P. GRANT.